United States Patent
Caples et al.

(10) Patent No.: US 9,849,923 B2
(45) Date of Patent: Dec. 26, 2017

(54) DUAL-STRAKE ASSEMBLY

(71) Applicant: GM GLOBAL TECHNOLOGY OPERATIONS LLC, Detroit, MI (US)

(72) Inventors: David C. Caples, Whitmore Lake, MI (US); Richard A. Berger, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/134,559

(22) Filed: Apr. 21, 2016

(65) Prior Publication Data

US 2017/0305479 A1    Oct. 26, 2017

(51) Int. Cl.
*B62D 35/02*    (2006.01)

(52) U.S. Cl.
CPC .................. *B62D 35/02* (2013.01)

(58) Field of Classification Search
CPC ............... B62D 35/001; B62D 35/02
USPC ...................................... 296/180.1
See application file for complete search history.

(56) References Cited

U.S. PATENT DOCUMENTS

| | | | |
|---|---|---|---|
| 8,668,245 B2* | 3/2014 | Kakiuchi ............... | B62D 35/02 180/69.1 |
| 2016/0368545 A1* | 12/2016 | Vogel .................. | B62D 35/001 |
| 2017/0036709 A1* | 2/2017 | Metka ................. | B62D 35/001 |
| 2017/0057565 A1* | 3/2017 | Sarhadiangardabad .................... | B62D 35/02 |
| 2017/0129552 A1* | 5/2017 | Han ...................... | B62D 35/02 |

* cited by examiner

*Primary Examiner* — Pinel E Romain
(74) *Attorney, Agent, or Firm* — Quinn IP Law

(57) ABSTRACT

A dual-strake assembly can be coupled to the underbody of the vehicle in order to maximize the downforce-to-drag ratio, thereby enhancing the vehicle aerodynamic efficiency. The dual-strake assembly includes a first strake and a second strake having different curvatures. The second strake has a chord length. Each of the first and second strakes has a first edge and a second edge opposite the first edge. The first edges of the first and second strakes are spaced apart from each other so as to define a gap, which has a gap distance measured from the first edge of the first strake to the first edge of the second strake. The gap distance is equal to or less than twenty-five percent of the chord length. The camber of the first strake is less than the camber of the second strake.

11 Claims, 4 Drawing Sheets

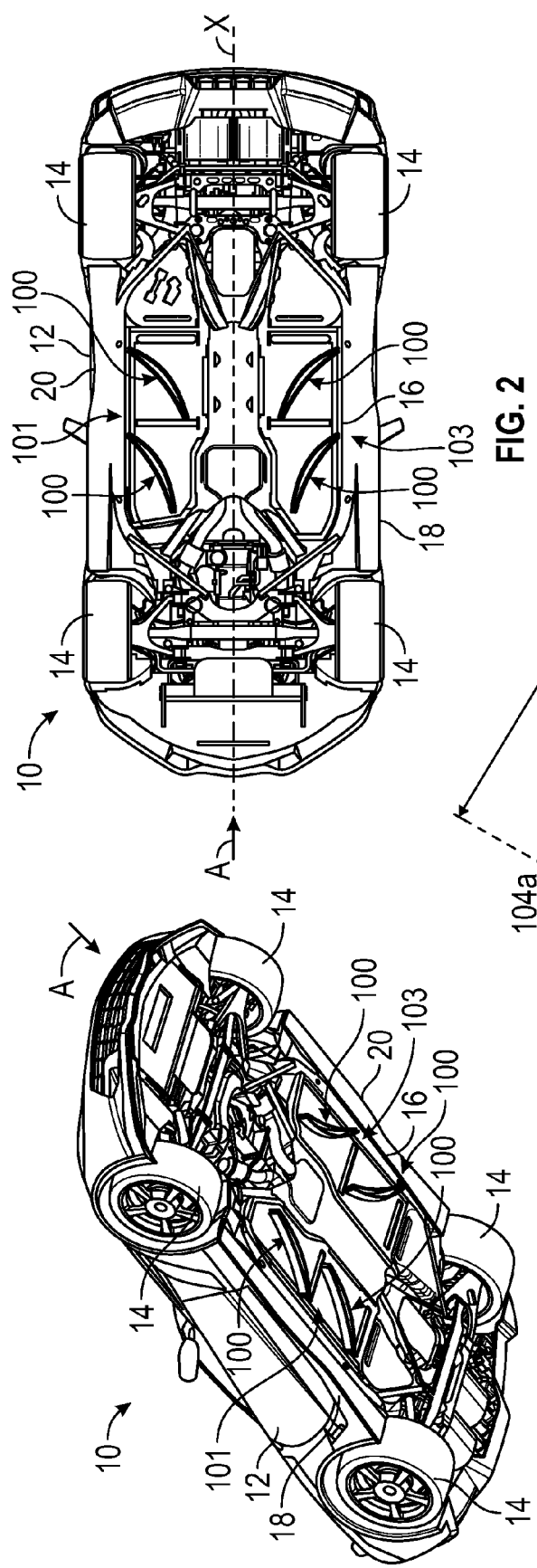
FIG. 1
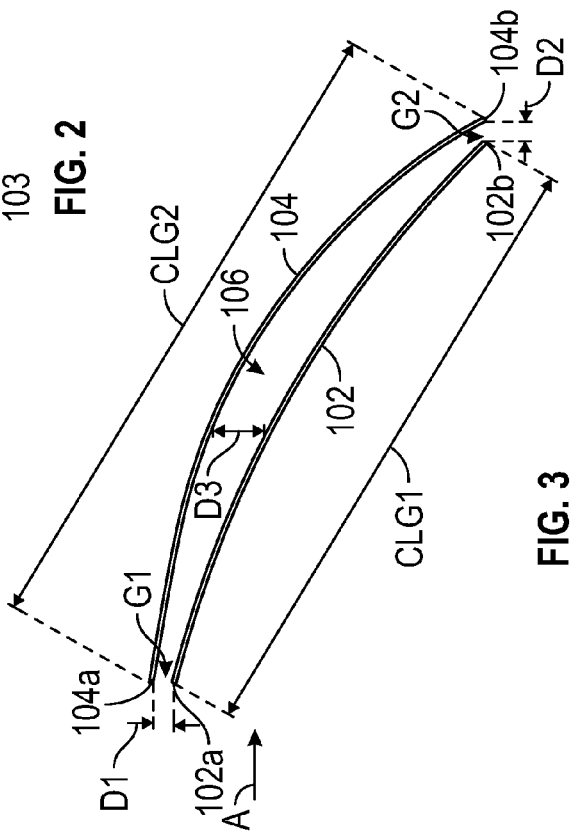
FIG. 2
FIG. 3

US 9,849,923 B2

DUAL-STRAKE ASSEMBLY

TECHNICAL FIELD

The present disclosure relates to a dual-strake assembly for maximizing the downforce-to-drag ratio in a vehicle.

BACKGROUND

Some vehicles include aerodynamic elements. These aerodynamic elements are part of the vehicle aerodynamic system and can affect vehicle aerodynamic factors, such as vehicle drag, noise, and lift forces.

SUMMARY

The present disclosure relates to dual-strake assemblies for vehicles. The dual-strake assembly can be coupled to the underbody of the vehicle in order to maximize the downforce-to-drag ratio. It is desirable to maximize the downforce-to-drag ratio of a vehicle in order to enhance the vehicle aerodynamic efficiency. In some embodiments, the dual-strake assembly includes a first strake and a second strake having different curvatures. The second strake has a chord length. Each of the first and second strakes has a first edge and a second edge opposite the first edge. The first edges of the first and second strakes are spaced apart from each other so as to define a gap therebetween. The gap has a gap distance measured from the first edge of the first strake to the first edge of the second strake. The gap distance is equal to or less than twenty-five percent (25%) of the chord length. The term "chord length" means a linear distance from the first or leading edge to the second or trailing edge of a strake along its chord line. The term "chord line" means a virtual line extending from the first or leading edge to the second or trailing edge of a strake. The camber of the first strake is less than the camber of the second strake. In the present disclosure, the term "camber" means the maximum distance from the chord line to the mean camber line. The term "mean camber line" means a virtual curve that lies halfway between the upstream surface and the downstream surface of a strake. The present disclosure also relates to vehicles including at least one dual-strake assembly.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic, perspective view of a vehicle including a plurality of dual-strake assemblies coupled to its underbody.

FIG. 2 is a schematic, bottom view of the vehicle shown in FIG. 1.

FIG. 3 is a schematic, bottom view of one of the dual-strake assemblies shown in FIG. 1.

DETAILED DESCRIPTION

Figure 4:
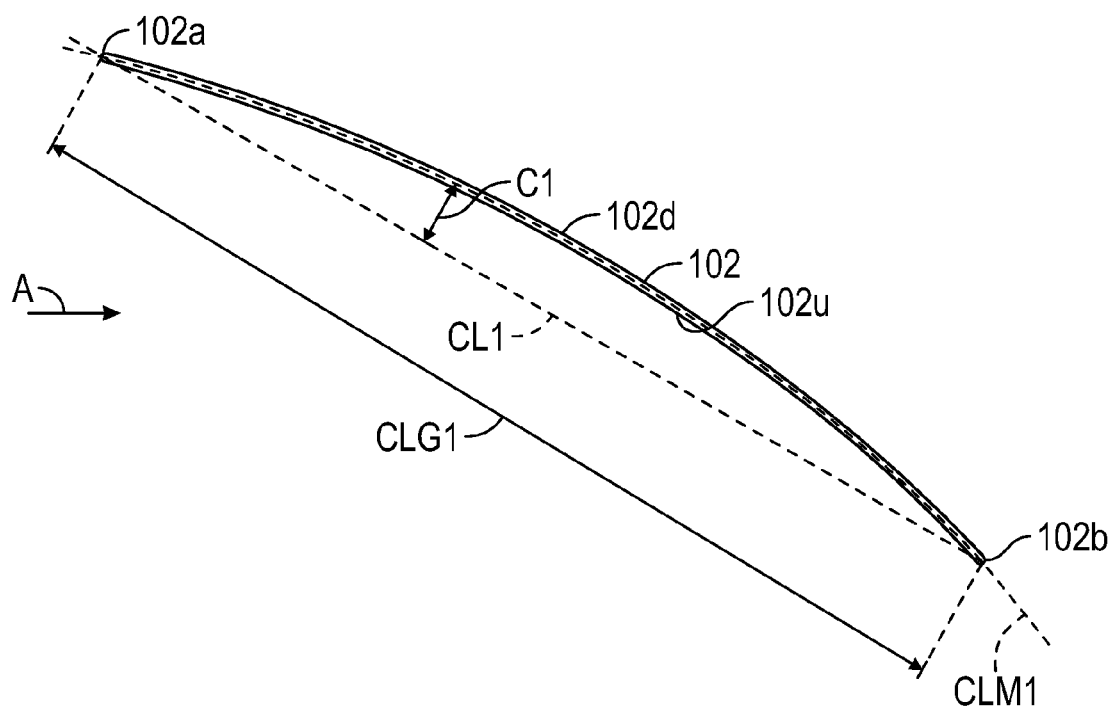
FIG. 4 is a schematic, bottom view of a first strake of one of the dual-strake assemblies shown in FIG. 1.

Referring to the drawings, wherein like reference numbers correspond to like or similar components throughout the several figures, FIGS. 1 and 2 illustrate a vehicle 10 capable of transporting passengers and/or objects. It is contemplated that the vehicle 10 may be any suitable land, sea, air or amphibious mobile platform, such as a car, all-terrain vehicle, farm equipment, airplane, or boat, among others. In the depicted embodiment, the vehicle 10 is a car and includes a vehicle body 12 and a plurality of tires 14 coupled to the vehicle body 12. The tires 14 are configured to contact the ground. The vehicle body 12 defines a vehicle central axis X and includes an underbody 16 adjacent the tires 14. The underbody 16 has a first lateral edge 18 and a second lateral edge 20 opposite the first lateral edge 18.

The vehicle 10 additionally includes a plurality of dual-strake assemblies 100 coupled to the underbody 16 of the vehicle body 12. In the present disclosure, the term "strake" means an aerodynamic device, such as a curved plate, capable of being attached to a vehicle in order to affect the vehicle aerodynamic characteristics, such as downforce, lift, and drag. The vehicle 10 includes a first set 101 of dual-strake assemblies 100 and a second set 103 of dual-strake assemblies 100. In order to produce a substantially equal downforce across the entire underbody 16, the first set 101 and the second set 103 of dual-strake assemblies 100 are equidistantly spaced from each other. The vehicle 10 may include one or more dual-strake assemblies 100. Irrespective of the quantity, the dual-strake assemblies 100 may be combined to work with one or more single strakes.

In the depicted embodiment, the vehicle 10 includes four dual-strake assemblies 100 for maximizing the vehicle downforce-to-drag ratio. The four dual-strake assemblies 100 are equidistantly spaced from each other in order to produce a substantially equal downforce across the entire underbody 16. In order to stabilize the downforce across the entire underbody 16, two dual-strake assemblies 100 can be positioned closer to the first lateral edge 18 than to the second lateral edge 20, and another two dual-strake assemblies 100 can be positioned closer to the second lateral edge 20 than to the first lateral edge 18. It is envisioned, however, that the vehicle 10 may include more or fewer dual-strake assemblies 100. Regardless of the quantity, each dual-strake assembly 100 includes a first or upstream strake 102 and a second or downstream strake 104. The second strake 104 is disposed adjacent the first strake 102. In the depicted embodiment, the first strake 102 and the second strake 104 are configured as curved panels or curved plates coupled to the underbody 16. The first strake 102 is disposed upstream of the airflow direction A when the vehicle 10 is moving forward, and the second strake 104 is disposed downstream of the airflow direction A when the vehicle 10 is moving forward.

Figure 5:
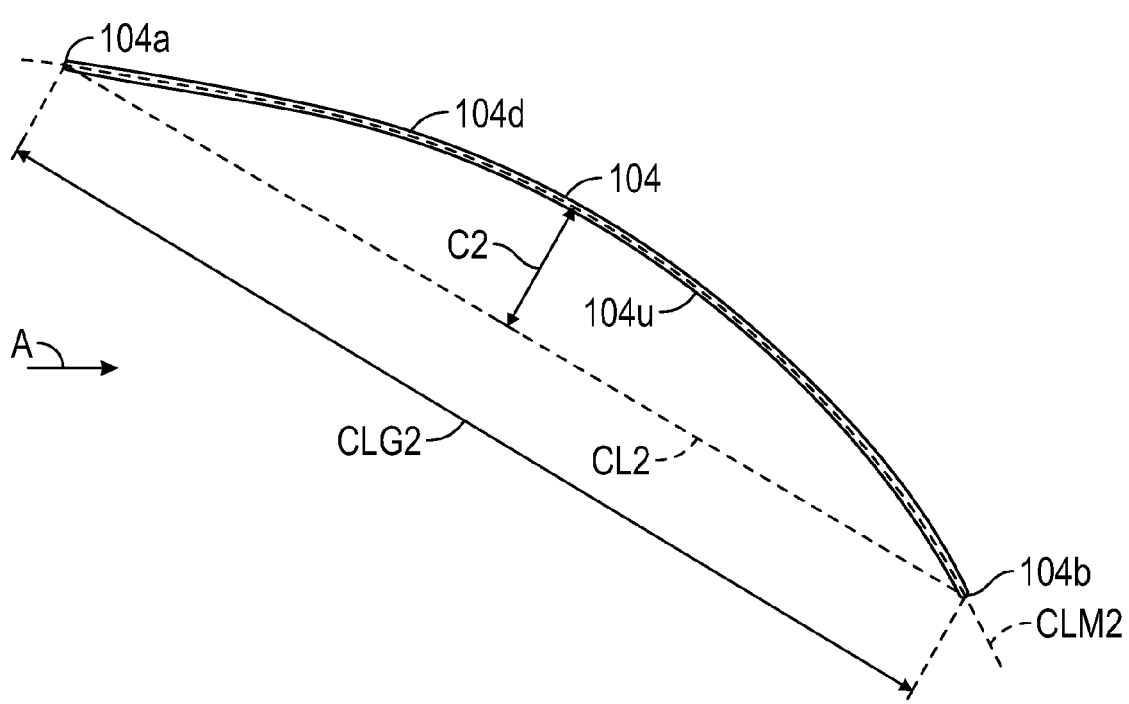
FIG. 5 is a schematic, bottom view of a second strake of one of the dual-strake assemblies shown in FIG. 1.

With reference to FIGS. 3-5, each of the first strake 102 and the second strake 104 has a substantially curved profile in order to maximize the downforce-to-drag ratio of the vehicle 10. The first strake 102 is made of a substantially rigid material, such as a rigid metal, and has a first or leading edge 102a and a second or trailing edge 102b. Further, the first strake 102 defines a chord line (i.e., the first chord line CL1). In the present disclosure, the term "chord line" means a virtual line extending from the first or leading edge to the second or trailing edge of a strake. Accordingly, the first chord line CL1 is a straight line extending from the first edge 102a to the second edge 102b of the first strake 102. The first chord line CL1 has a chord length (i.e., the first chord length CLG1). In the present disclosure, the term "chord length" means a linear distance from the first or leading edge to the second or trailing edge of a strake along its chord line. Thus, the first chord length CLG1 is the linear distance from the first edge 102a to the second edge 102b of the first strake 102 along the first chord line CL1.

The first strake 102 further includes a first or upstream surface 102u and a second or downstream surface 102d. The first surface 102u is disposed upstream to the second surface 102d relative to the airflow direction A when the vehicle 10 is moving forward. Each of the first surface 102u and the second surface 102d is disposed between the first edge 102a and the second edge 102b. Therefore, the first edge 102a can directly interconnect the first surface 102u and the second surface 102d of the first strake 102. Likewise, the second edge 102b can directly interconnect the first surface 102u and the second surface 102d of the first strake 102. The first surface 102u and the second surface 102d are both curved. Thus, each of the first surface 102u and the second surface 102d of the first strake 102 has a mean curvature. In the present disclosure, the term "mean curvature" means the average of the instantaneous curvature of a surface. The mean curvatures of the first surface 102u and the second surface 102d can be equal in order to maximize the downforce-to-drag ratio of the vehicle 10.

The first strake 102 also defines a mean camber line (i.e., the first mean camber line CLM1). In the present disclosure, the term "mean camber line" means a virtual curve that lies halfway between the upstream surface and the downstream surface of a strake. Accordingly, the first mean camber line CLM1 is a virtual curve that lies halfway between the first surface 102u and the second surface 102d of the first strake 102. The first strake 102 has a camber (i.e., the first camber C1). In the present disclosure, the term "camber" means the maximum distance from the chord line to the mean camber line. Accordingly, the first camber C1 is the maximum distance from the first chord line CL1 to the first mean camber line CLM1.

The second strake 104 is made of a substantially rigid material, such as a rigid metal, and has a first or leading edge 104a and a second or trailing edge 104b. Further, the second strake 104 defines a chord line (i.e., the second chord line CL2). The second chord line CL2 is a straight line extending from the first edge 104a to the second edge 104b of the second strake 104. The second chord line CL2 has a chord length (i.e., the second chord length CLG2). The second chord length CLG2 is the linear distance from the first edge 104a to the second edge 104b of the second strake 104 along the second chord line CL2. The first strake 102 and the second strake 104 may have any suitable height combination. For instance, the first strake 102 and the second strake 104 may have the same height.

The second strake 104 further includes a first or upstream surface 104u and a second or downstream surface 104d. The first surface 104u is disposed upstream to the second surface 104d relative to the airflow direction A when the vehicle 10 is moving forward. Each of the first surface 104u and the second surface 104d is disposed between the first edge 104a and the second edge 104b. Therefore, the first edge 104a can directly interconnect the first surface 104u and the second surface 104d of the second strake 104. Likewise, the second edge 104b can directly interconnect the first surface 104u and the second surface 104d of the second strake 104. The first surface 104u and the second surface 104d are both curved. Thus, each of the first surface 104u and the second surface 104d of the second strake 104 has a mean curvature. The mean curvatures of the first surface 104u and the second surface 104d can be equal in order to maximize the downforce-to-drag ratio of the vehicle 10. Moreover, the mean curvatures of the first surface 102u and the second surface 102d are less than the mean curvature of the first surface 104u and the second surface 104d of the second strake 104 in order to maximize the downforce-to-drag ratio of the vehicle 10.

The second strake 104 also defines a mean camber line (i.e., the second mean camber line CLM2). The second mean camber line CLM2 is a virtual curve that lies halfway between the first surface 104u and the second surface 104d of the second strake 104. The second strake 104 has a camber (i.e., the second camber C2). The second camber C2 is the maximum distance from the second chord line CL2 to the second mean camber line CLM2. The first camber C1 of the first strake 102 is less than the second camber C2 of the second strake 104 in order to maximize the downforce-to-drag ratio of the vehicle 10.

With specific reference to FIG. 3, the first edge 102a of the first strake 102 is spaced apart from the first edge 104a of the second strake 104 so as to define a gap (i.e., the first gap G1). The first gap G1 accelerates airflow between the first strake 102 and the second strake 104, when compared to other conventional strake assemblies, such as a single strake assembly, thereby maximizing downforce-to-drag ratio of the vehicle 10. Moreover, the first gap G1 has a first gap distance D1, which is measured from the first edge 102a of the first strake 102 to the first edge 104a of the second strake 104. In order to maximize the downforce-to-drag ratio of the vehicle 10, the first gap distance D1 is equal to or less than twenty-five percent (25%) of the second chord length CLG2. For example, the first gap distance D1 may range between zero percent (0%) and twenty-five percent (25%) of the second chord length CLG2. To further maximize the downforce-to-drag ratio of the vehicle 10, the first gap distance D1 can range between three percent (3%) and ten percent (10%) of the second chord length CLG2.

The second edge 102b of the first strake 102 is spaced apart from the second edge 104b of the second strake 104 so as to define another gap (i.e. the second gap G2). The second gap G2 accelerates airflow between the first strake 102 and the second strake 104, when compared to other conventional strake assemblies, such as a single strake assembly, thereby maximizing downforce-to-drag ratio of the vehicle 10. Further, the second gap G2 has a second gap distance D2, which is measured from the second edge 102a of the first strake 102 to the second edge 104b of the second strake 104. In order to maximize the downforce-to-drag ratio of the vehicle 10, the second gap distance D2 is equal to or less than twenty-five percent (25%) of the second chord length CLG2. For instance, the second gap distance D2 may range between zero percent (0%) and twenty-five percent (25%) of the second chord length CLG2. To further maximize the downforce-to-drag ratio of the vehicle 10, the second gap distance D2 can range between three percent (3%) and ten percent (10%) of the second chord length CLG2.

The first strake 102 and the second strake 104 are spaced apart from each other so as to define a central opening 106 therebetween. The central opening 106 accelerates airflow between the first strake 102 and the second strake 104, when compared to other conventional strake assemblies, such as a single strake assembly. The central opening 106 has a maximum opening distance D3 measured from the first strake 102 to the second strake 104. In order to maximize the downforce-to-drag ratio of the vehicle 10, the maximum opening distance D3 is greater than the first gap distance D1 and the second gap distance D2. The first gap distance D1 and the second gap distance D2 may be substantially equal in order to produce a substantially equal downforce across the entire underbody 16.

Figure 6:
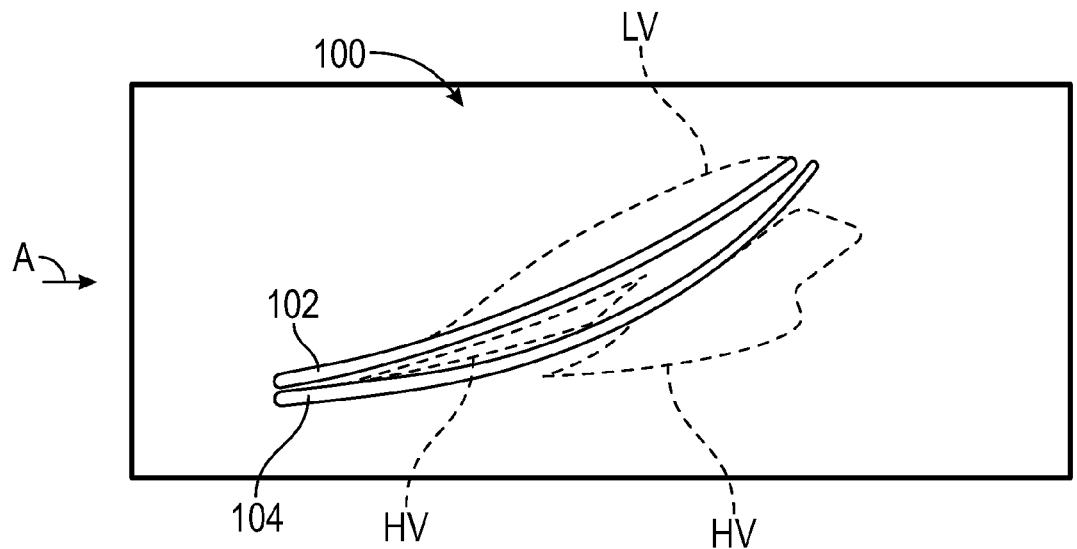
FIG. 6 is a schematic computer fluid dynamics model of the dual-strake assembly, illustrating high and low airflow velocity areas.

As shown in FIG. 6, incorporating the first gap G1 and the second gap G2 in the dual-strake assembly 100 increases the high velocity areas HV and decreases low velocity areas LV, when compared to other conventional strake assemblies, such as a single strake assembly. For instance, incorporating the first gap G1 and the second gap G2 in the dual-strake assembly 100 generates a high velocity area HV between the first strake 102 and the second strake 104, and downstream of the dual-strake assembly 100. In FIG. 6, the airflow velocity is higher at the high velocity areas HV than at the low velocity areas LV.

Figure 7:
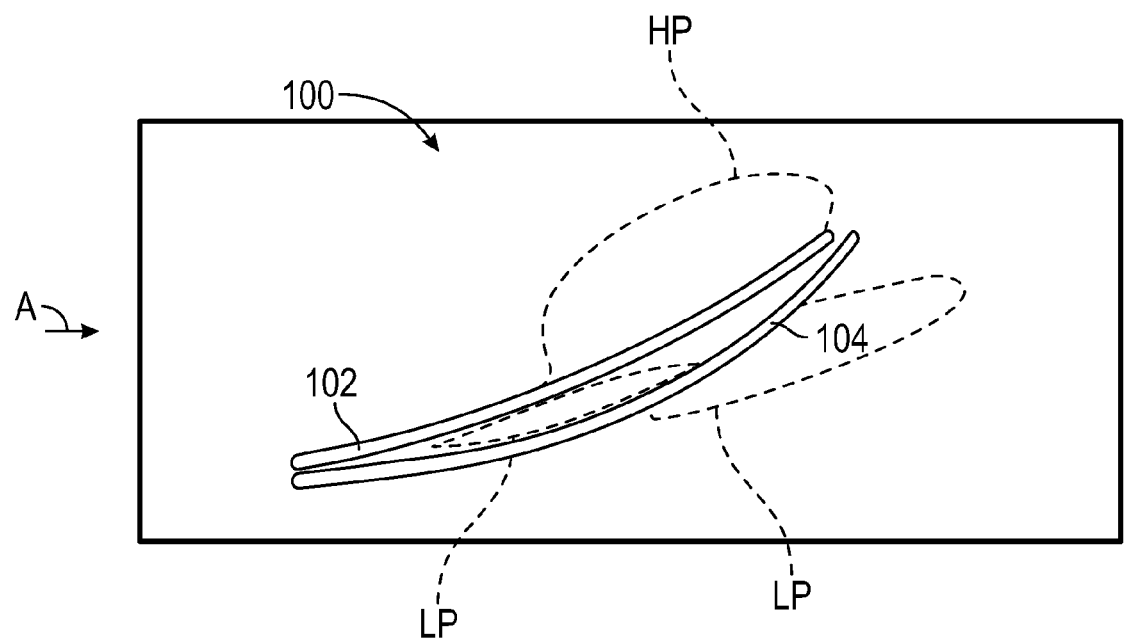
FIG. 7 is a schematic computer fluid dynamics model of the dual-strake assembly, illustrating the high and low air pressure areas.

Further, as shown in FIG. 7, because the first camber C1 of the first strake 102 is less than the second camber C2 of the second strake 104, and the mean curvatures of the first surface 102u and the second surface 102d are less than the mean curvature of the first surface 104u and the second surface 104d of the second strake 104, the dual-strake assembly 100 reduces high pressure generation when compared to other conventional strake assemblies, such as a single strake assembly, thereby maximizing downforce-to-drag ratio of the vehicle 10. As shown in FIG. 7, a low pressure area LP is generated between the first strake 102 and the second strake 104. Another low pressure area LP is generated downstream of the second strake 104. A high pressure area HP is generated upstream of the first strake 102. In FIG. 7, the air pressure is higher at the high pressure areas HP than at the low pressure areas LP.

Figure 8:
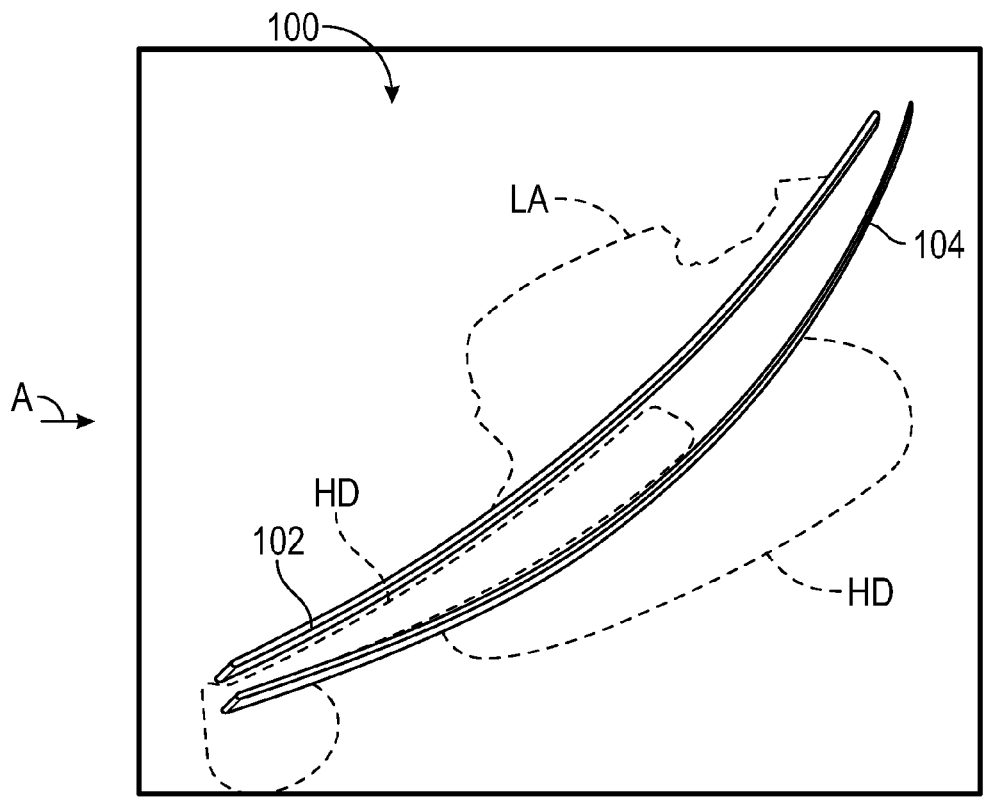
FIG. 8 is a schematic computer fluid dynamics model of the dual-strake assembly, illustrating the high downforce areas.

Moreover, as shown in FIG. 8, because the first camber C1 of the first strake 102 is less than the second camber C2 of the second strake 104, and the mean curvatures of the first surface 102u and the second surface 102d are less than the mean curvature of the first surface 104u and the second surface 104d of the second strake 104, the dual-strake assembly 100 generates vortices, thereby increasing the high downforce areas HD and decreasing lift areas LA when compared to other conventional strake assemblies, such as a single strake assembly. Specifically, a high downforce area HD is generated between the first strake 102 and the second strake 104. Another high downforce area HD is generated downstream of the second strake 104. In FIG. 8, more downforce is generated in the high downforce area HD than at the lift areas LA. Overall, computer fluid dynamics models demonstrate that the dual-strake assembly 100 increases the downforce-to-drag ratio by at least thirty percent (30%) when compared to other conventional strake assemblies, such as a single strake assembly.

Figure 9:
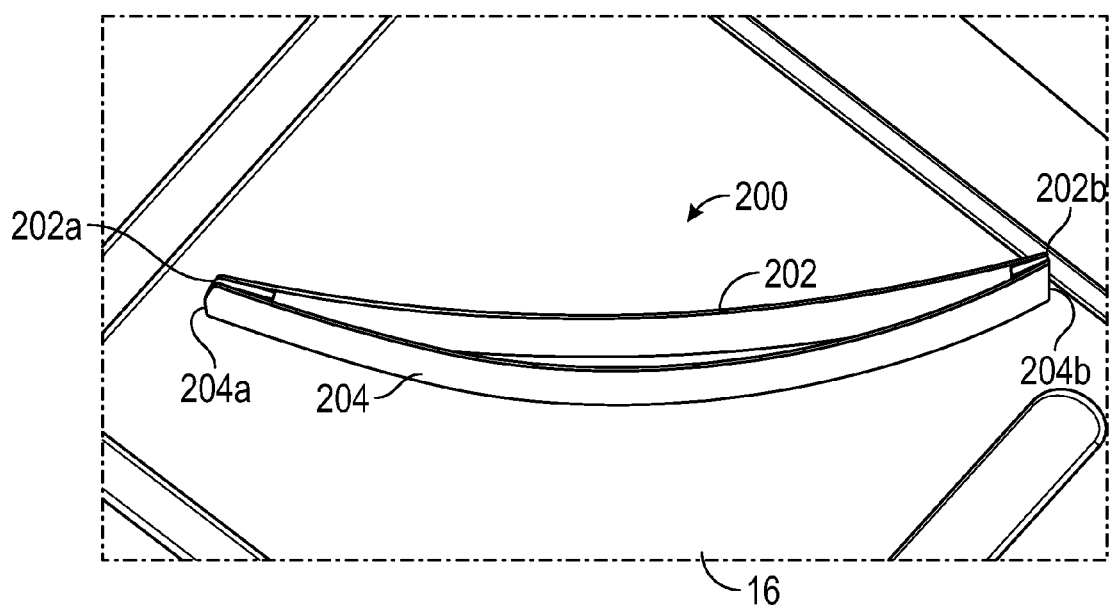
FIG. 9 is a schematic, perspective, fragmentary view of a vehicle underbody and a dual-strake assembly in accordance with another embodiment of the present disclosure.

FIG. 9 schematically illustrates a dual-strake assembly 200 in accordance with another embodiment of the present disclosure. In the interest of brevity, only the differences between the dual-strake assembly 200 and the dual-strake assembly 100 are described in detail below. The dual-strake assembly 200 has a first strake 202 and a second strake 204 interconnected to each other. The first edge 202a of the first strake 202 is directly coupled to the first edge 204a of the second strake 204 (via, for example, welding). The second edge 202b of the first strake 202 is directly coupled to the second edge 204b of the second strake 204 (via, for example, welding).

While the best modes for carrying out the teachings have been described in detail, those familiar with the art to which this disclosure relates will recognize various alternative designs and embodiments for practicing the teachings within the scope of the appended claims.

The invention claimed is:

1. A vehicle, comprising:
   a vehicle body including an underbody;
   at least one dual-strake assembly coupled to the underbody, wherein the at least one dual-strake assembly includes:
     a first strake coupled to the underbody, wherein the first strake has a first camber; and
     a second strake coupled to the underbody, wherein the second strake has a second camber, and the first camber is less than the second camber; and
   wherein the at least one dual-strake assembly includes a first set of dual-strake assemblies and a second set of dual-strake assemblies, and the first set of dual-strake assemblies and the second set of dual-strake assemblies are equidistantly spaced from each other.

2. The vehicle of claim 1, wherein each of the first and second strakes has a first edge and a second edge opposite the first edge, and the first edges of the first and second strakes are spaced apart from each other so as to define a gap therebetween.

3. The vehicle of claim 2, wherein the second strake has a chord length, the gap has a gap distance measured from the first edge of the first strake to the first edge of the second strake, and the gap distance is equal to or less than twenty-five percent of the chord length.

4. The vehicle of claim 3, wherein the gap is a first gap, and the second edges of the first and second strakes are spaced apart so as to define a second gap.

5. The vehicle of claim 4, wherein the gap distance is a first gap distance, the second gap has a second gap distance measured from the second edge of the first strake to the second edge of the second strake, and the second gap distance is equal to or less than twenty-five percent of the chord length.

6. The vehicle of claim 5, wherein the first gap distance is equal to the second gap distance.

7. The vehicle of claim 6, wherein the first strake is spaced from the second strake so as to define a central opening therebetween.

8. The vehicle of claim 7, wherein the central opening has a maximum opening distance measured from the first strake to the second strake, and the maximum opening distance is greater than the first gap distance.

9. The vehicle of claim 8, wherein the maximum opening distance is greater than the second gap distance.

10. The vehicle of claim 1, wherein each of the first and second strakes has a first edge and a second edge opposite the first edge, and the first edges of the first and second strakes are directly coupled to each other.

11. The vehicle of claim 10, wherein the second edges of the first and second strakes are directly coupled to each other.

* * * * *